W. S. SHERMAN.
END MATCHER.
APPLICATION FILED JUNE 24, 1912.

1,091,773.

Patented Mar. 31, 1914.

W. S. SHERMAN.
END MATCHER.
APPLICATION FILED JUNE 24, 1912.

1,091,773.

Patented Mar. 31, 1914.
7 SHEETS—SHEET 4.

FIG. 4.

W. S. SHERMAN.
END MATCHER.
APPLICATION FILED JUNE 24, 1912.

1,091,773.

Patented Mar. 31, 1914.
7 SHEETS—SHEET 5.

WITNESSES.

INVENTOR.
Willis S. Sherman,
By Morsell & Caldwell
ATTORNEYS.

W. S. SHERMAN.
END MATCHER.
APPLICATION FILED JUNE 24, 1912.

1,091,773.

Patented Mar. 31, 1914.
7 SHEETS—SHEET 6.

WITNESSES
INVENTOR
Willis S. Sherman,
By Morsell & Caldwell.
ATTORNEYS.

W. S. SHERMAN.
END MATCHER.
APPLICATION FILED JUNE 24, 1912.

1,091,773.

Patented Mar. 31, 1914.
7 SHEETS—SHEET 7.

WITNESSES.
INVENTOR.
Willis S. Sherman,
By Morsell & Caldwell.
ATTORNEYS.

UNITED STATES PATENT OFFICE.

WILLIS S. SHERMAN, OF MILWAUKEE, WISCONSIN.

END-MATCHER.

1,091,773.  Specification of Letters Patent.  Patented Mar. 31, 1914.

Application filed June 24, 1912. Serial No. 705,536.

*To all whom it may concern:*

Be it known that I, WILLIS S. SHERMAN, a citizen of the United States, and resident of Milwaukee, in the county of Milwaukee and State of Wisconsin, have invented new and useful Improvements in End-Matchers, of which the following is a description, reference being had to the accompanying drawings, which are a part of this specification.

This invention has for its object to provide a continuously operating end matching machine which will automatically feed the work past the cutter and which will not require the close attention of the operator in timing the placing of the strips in the machine.

Another object of the invention is to prevent a strip of work being operated upon before it is in its proper position.

Another object of the invention is to provide an improved form of clamping jaws for receiving the work from the work feeder after the operation has been performed thereon, which clamping jaws perform the office of moving the work to one side of the plane of the cutter and release it.

Another object of the invention is to improve upon details of construction of end matchers of this type.

With the above and other objects in view the invention consists in the end matcher as herein claimed and all equivalents.

Referring to the accompanying drawings in which like characters of reference indicate the same parts in the different views.

In these drawings 20 indicates a frame structure in the form of a hollow casing or shell with the gear casing 21 attached to the rear of its base portion. A drive shaft 22 with a belt pulley 23 for connection with any suitable source of power enters the gear casing 21 and carries a beveled pinion 24 meshing with a beveled gear 25 which is journaled within the gear casing and carries a pinion 26 meshing with a gear wheel 27 also journaled within the casing. The gear wheel 27 carries an elliptical gear 28 meshing with a complementary elliptical gear 29 on a shaft 30 which enters the gear casing 21 from the interior of the base portion of the frame 20 where it is provided with a cam 31. On the side of the cam 31 is a wrist pin 32 on which is mounted a connecting rod 33 which is connected at its upper end to a vertical reciprocating work feeding slide 34 by having its upper end loosely mounted on a horizontal shaft 35 journaled in said slide. The slide works between guide ways 36 on the frame and is driven from the wrist pin 32 in much the same manner as the crosshead of a steam engine.

Figure 1:
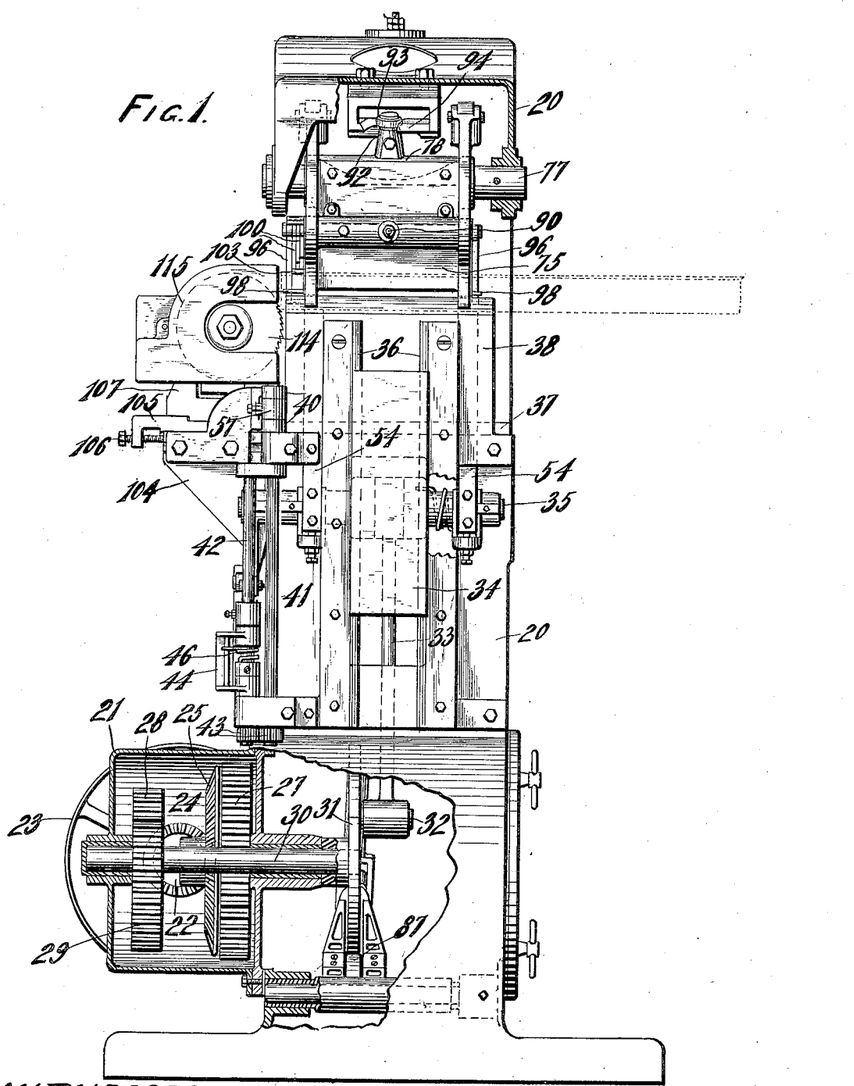
Figure 1 is a front elevation partly in section of an end matcher constructed in accordance with this invention with parts in the position they assume when the work shown in dotted lines has passed the cutter.
Figure 2:
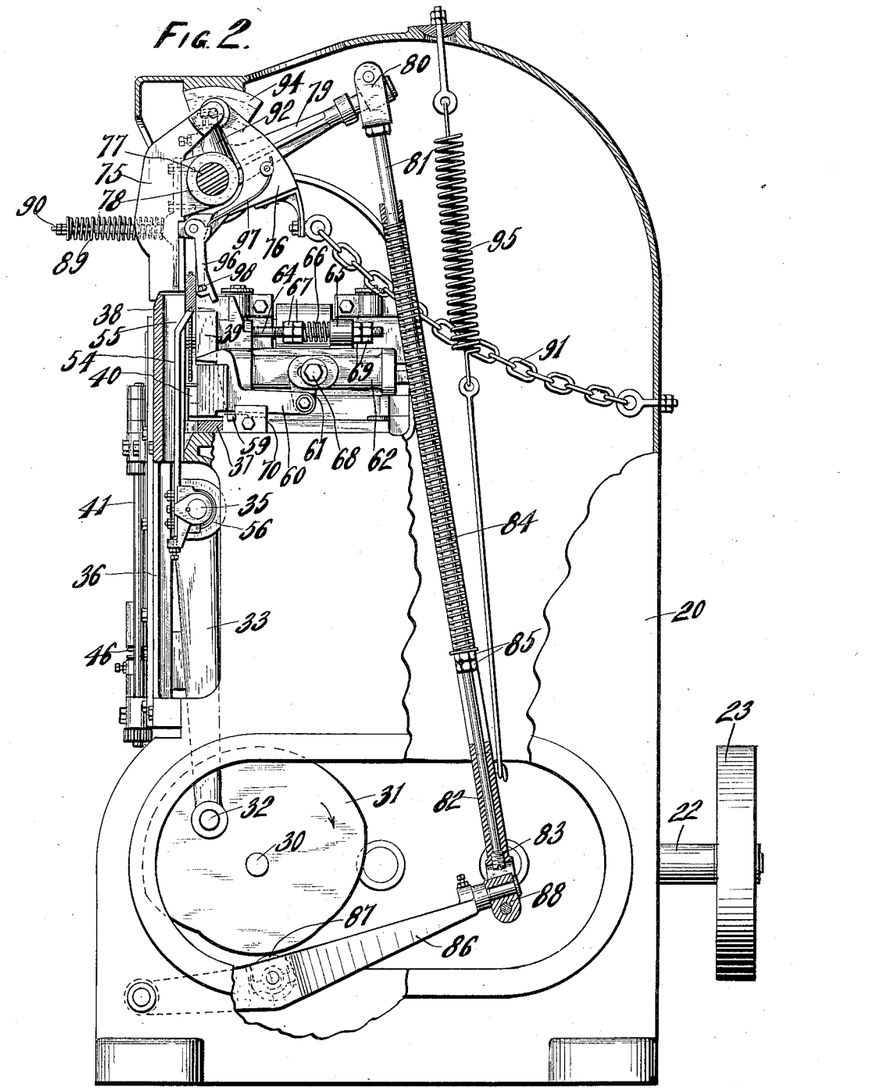
Fig. 2 is a sectional side elevation thereof with the same position of the parts.
Figure 3:
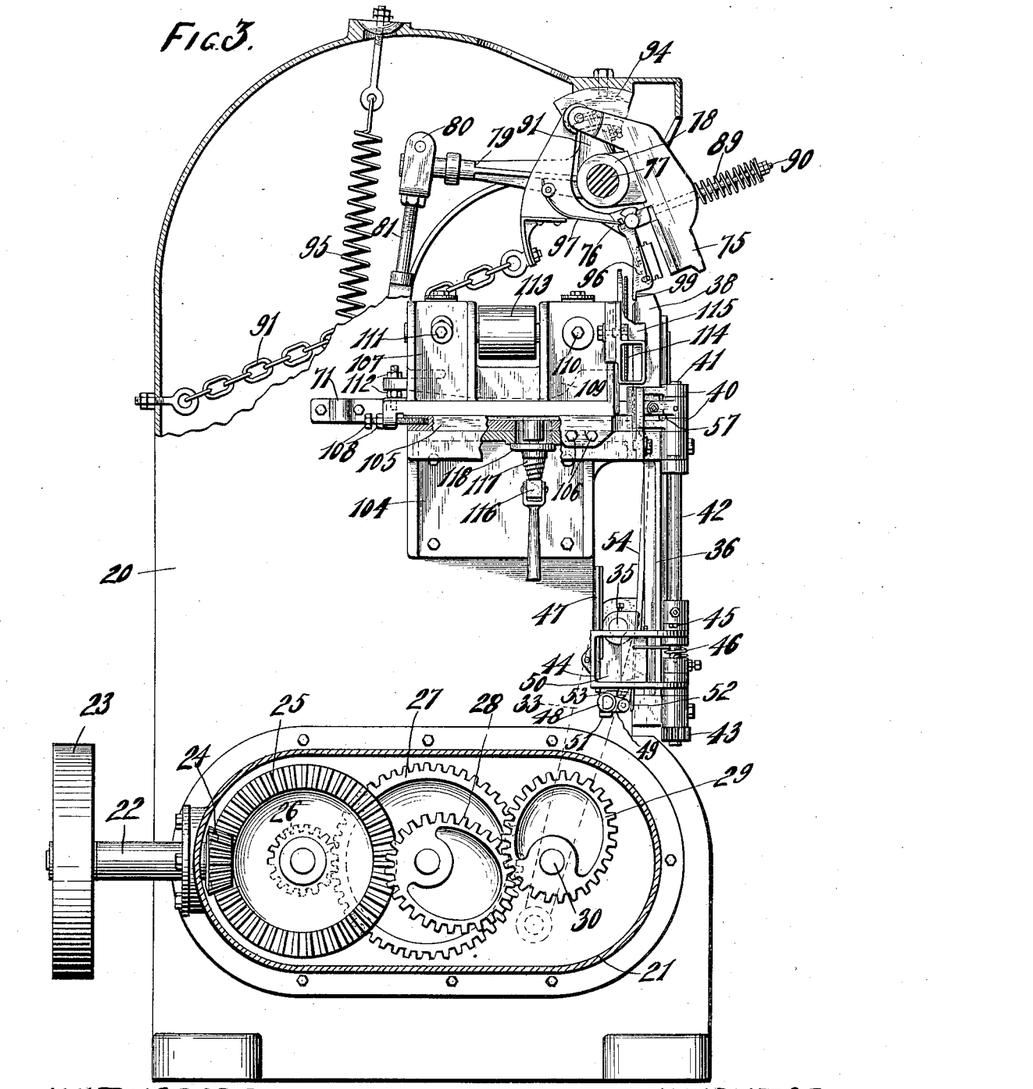
Fig. 3 is a similar view of the opposite side of the machine with parts in position for ejecting the work.
Figures 5, 9, 10, 16:
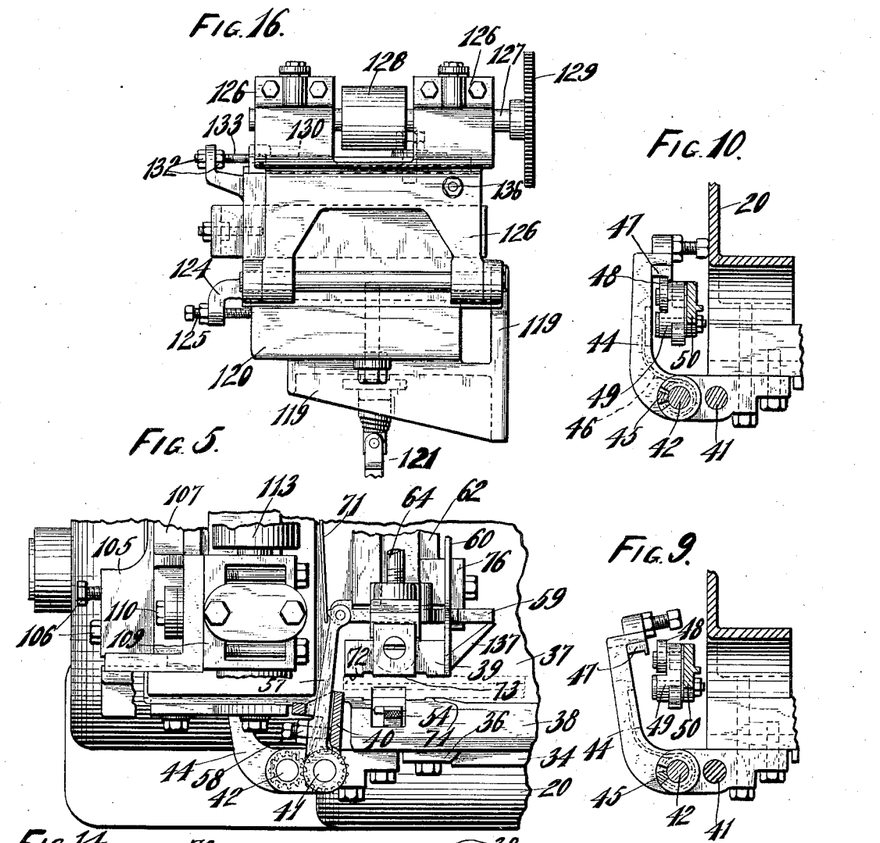
Fig. 5 is a similar view of a portion of the machine with the cutter removed and showing the position of parts before the work in dotted lines has been moved to its proper position.
Fig. 9 is a sectional plan view of parts showing the relation of the actuating roller for the feed fingers and the rail for engagement therewith under normal conditions, when work is not in place to be fed and corresponding to the position of parts shown in Figs. 5 and 7.
Fig. 10 is a similar view of these parts in the position assumed by them when work is in place to be fed and corresponding to the position of parts shown in Figs. 4 and 8.
Fig. 16 is a front elevation of a modified form of saw frame construction to be substituted for the one shown in Fig. 3 when it is desired to cut tongues instead of grooves.
Figures 6, 7, 8, 11, 12:
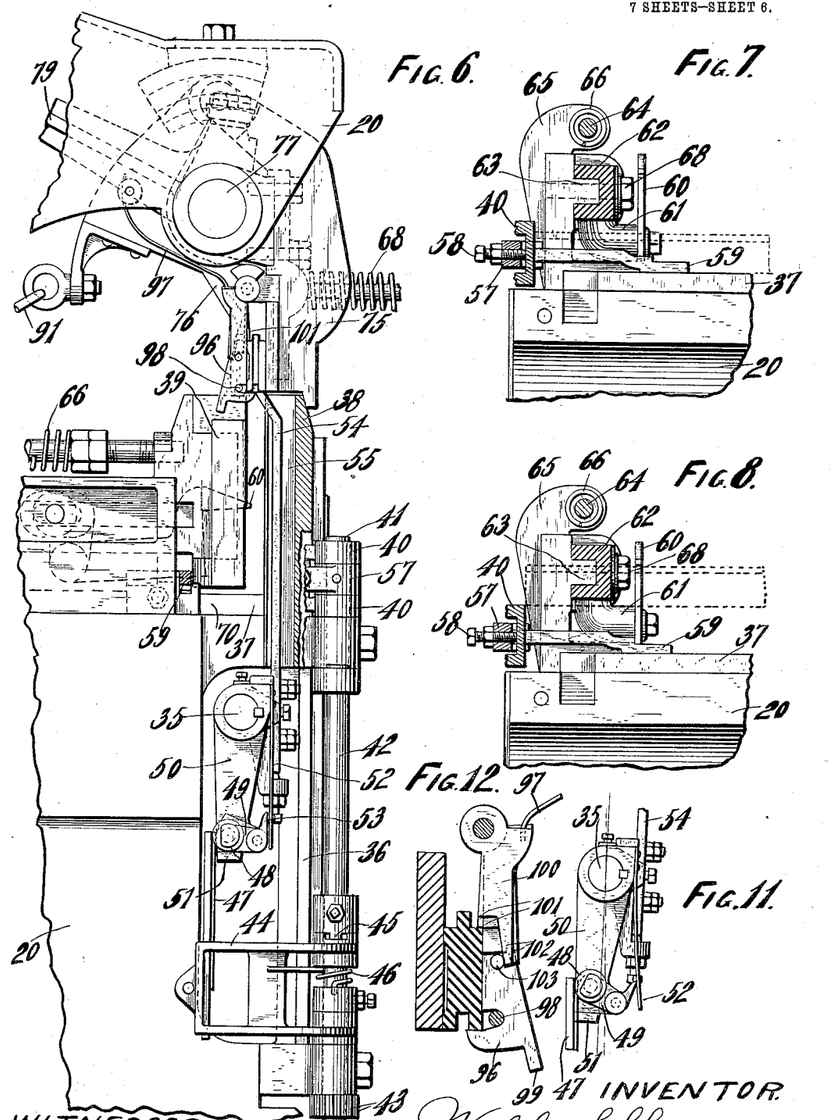
Fig. 6 is a view similar to Fig. 3 of a portion of the machine showing the parts in the position assumed by them at the end of the movement of the feeding means.
Fig. 7 is a detail view showing the trigger and latch mechanism in the position it normally occupies before the work has been forced into place to release the trigger.
Fig. 8 is a similar view with the parts in the position assumed by them after the work has been forced into place and before it releases the latch in its upward movement.
Fig. 11 is a detail view showing the position of the actuating roller for the feed fingers at the beginning of the downward movement of the feeding means.
Fig. 12 is a detail view showing the operation of the work engaging dogs of the work discharging means.
Figure 13:
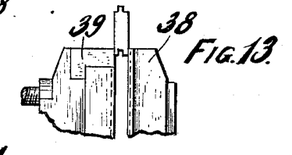
Fig. 13 is a detail view showing the engagement of the work by the presser guides.
Figure 14:
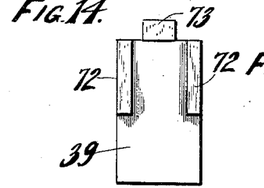
Fig. 14 is a detail view of the face of the presser guide.
Figure 15:
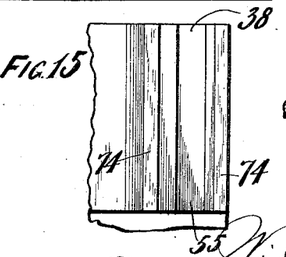
Fig. 15 is a similar view of the face of the stationary guide.

The frame is provided with a flat horizontal portion which constitutes a table 37 on which work is placed previous to introduction into the machine. A stationary guide head 38 forms a vertical side wall for the table against which the operator draws the work and a movable presser guide 39 opposite the rear portion of the stationary guide 38 coöperates therewith to form a narrow vertical passageway between them through which the work may be lifted by the work feeding means and in its passage between these guides it encounters the cutters which cut the tongue or groove in the end thereof. When the work resting on the table 37 is entered between the stationary guide head 38 and the presser guide head 39 and forced inwardly between these guides it engages a trigger 40 in its path and causes the same to move. This trigger 40 constitutes an arm fixed on a vertical shaft 41 which is geared to a similar shaft 42 by means of intermeshing pinions 43 at their lower ends. The movement of the trigger 40 by the pressure of the work thereagainst thus causes the vertical shaft 42 to be turned in a clockwise direction as viewed in Fig. 9. Referring to Fig. 6 a frame 44 is mounted on vertical shaft 42 and has a limited play thereon permitted by a lug 45 carried by the shaft 42 working within a somewhat larger notch or recess in the frame, and the frame is normally held under the action of a spring 46 with one end fixed on the shaft 42 and the other end bearing against the frame. At its outer end the frame 44 carries a flanged rail 47 which in one position of the frame, as shown in Fig. 10, stands in the path of the roller 48 on a swinging member 49 (Fig. 6) which is pivotally mounted on an arm 50 keyed on the previously mentioned shaft 35 of the slide 34. In the other position of the frame 44 the track 47 is out of the path of the roller 48 as shown in Fig. 9. A lug 51 standing out from the arm 50 is normally engaged by the swinging member 49 which is given a tendency in that direction by a spring 52 bearing on a projection 53 of the member 49. The swinging movement of arm 50 causes shaft 35 to rock and as this shaft has secured to it a pair of upwardly extending work feeding fingers 54 said fingers are caused to move into or out of position for engaging the work by such movement. The work feeding fingers 54 ride in grooves 55 provided for them in the head block 38 and have their upper ends angular to project from the grooves 55 on the upward stroke of the feeding device if the roller 48 rides on the track 47 due to the trigger 40 having been swung by the work when the latter was forced into its position to be operated upon. At other times the angular ends of the work feeding fingers 54 travel within the grooves 55 of the head block 38 where they will not contact with the work and cause injury thereto by engaging it before it is in position to be operated upon. The roller 48 does not leave the track at the upper end of the stroke of the feeding mechanism, where it is shown in Fig. 6, but immediately upon the beginning of the downward movement of the feeding mechanism the pivoted member 49, which carries the roller, swings to the position shown in Fig. 11 and permits a coil spring 56 surrounding the shaft 35 to return it to its normal position and withdraw the fingers into the grooves 55 away from the plane of the work. When the operator forces the work into the guideway between the head block 38 and the presser head 39 to operate the trigger 40 it is not necessary for him to hold it in this position against the pressure of the trigger until the feeding fingers engage it, for as soon as the trigger is operated it becomes latched in its operative position and is held there until released by the upward movement of the work. To this end a latch lever 57 (Figs. 5 and 6) is fixed on the vertical shaft between two ears of the trigger 40 which is loosely mounted on the shaft and a set screw 58 on the lever 57 engages the trigger 40 through an opening in which the latch lever passes as seen in Figs. 3 and 5. Pivotally connected to the end of the latch lever 57 is a bolt 59 which slides horizontally on the table and is provided with a shoulder for engagement by a latch. The latch 60 is pivotally mounted on an arm 61 projecting from the presser head frame 62 which is slidably mounted on a rib 63 of the frame 20. The presser head frame 62 has the presser head 39 pivotally mounted thereon on a vertical axis so as to be capable of rocking slightly to adapt itself to a taper or unevenness in the work clamped thereby.

A threaded stem 64 projects from the presser head frame 62 and passes through a bracket 65 of the frame 20 and a coil spring 66 surrounding the stem 64 and bearing on the bracket 65 at one end and at its other end against a pair of set nuts 67 on the threaded stem 64 serves to force the presser head frame 62 to slide on the rib 63 toward the stationary guide head 38, such movement being permitted by the bolt 68 with which said presser head frame 62 is held on the rib 63 by reason of the fact that said bolt fits in a longitudinal slot in said presser head frame 62. The movement of the presser head frame toward the stationary guide head 38 is adjustably limited by means of a pair of nuts 69 threaded on the stem 64 and engaging the bracket 65. The bolt 59 of the latch mechanism travels in a notch of a small plate 70 bolted to the frame to guide it in its travel beneath the dog 60 and a leaf spring 71 which is mounted so as to be capable of adjusting its pressure bears on the latch lever 57 to give said bolt 59 a tendency to move outwardly. When the work is inserted in the machine and engages the trigger 40 to swing the latch lever 57 the bolt 59 is withdrawn and the dog 60 drops into engagement with the shoulder thereof, as shown in Fig. 8, to lock the parts, including the frame 44 with its flanged rail 47, in the positions into which they have been moved by the engagement of the work with said trigger as previously explained. The dog 60 has a nose projecting into the path of the work in its upward travel between the presser head and the guide head to be engaged and lifted thereby to release the bolt 59 and permit the spring 71 to return it to its normal projected position. The movement of the latch lever 57 incident to the return of bolt 59 to its normal position under action of spring 71 causes the trigger 40 to also move, the work passing above these parts to permit of such movement while the dog 60 is held upwardly. The movement of latch lever 57 produces a turning movement of shafts 41 and 42, but the play of lug 45 in the notch of frame 44 permits of this turning movement of shaft 42 without affecting frame 44 which is retained in its position shown in Fig. 10 by the engagement of the flange of rail 47 with roller 48. This position of the parts continues during the remainder of the upward movement of the work feeding means and the return downward movement thereof until the roller 48 passes out of engagement with the flanged rail 47, permitting spring 46 to swing frame 44 to the position shown in Fig. 9 where the roller will not again engage the flanged rail until another strip of work has been placed in position in the machine to return said flanged rail to its position of engagement with the roller. Should the work be inserted in the machine at the time when the roller is making its upward travel and is higher than the lower end of the rail the rail will be ineffective for producing the projection of the work feeding fingers since it engages the flat face of the roller only. This does not, however, interfere with or delay the operator in placing the work in position in the machine, for the play of the lug 45 in the notch of frame 44 permits the trigger and its parts to be moved by the work to the latching position so that the flanged rail becomes effective on the succeeding upward movement of the work feeding means. As seen in Fig. 6 the work engaging face of presser head 39 is uneven, that is, it stands closer to the guide head 38 at its upper part than at its lower part and this is to facilitate the insertion of the work at the lower part, the clamping effect due to the pressure of spring 66 only becoming effective after the work has started its upward movement. This engaging face of the presser head 39 further varies by having its pressure surface shift during the upward travel of the work from a pair of parallel pressure surfaces 72 at the side edges thereof to a single pressure surface 73 at the middle thereof, whereas the pressure surfaces 74 of the guide head 38 correspond with the pressure surfaces 72 throughout the length thereof. While the work is traveling past the cutters it is clamped between engaging surfaces 72 and 74 directly opposite each other, but as the work leaves the cutters it is clamped between the engaging surfaces 73 and 74 which are not opposite each other and consequently the pressure of the presser head against one side of the groove of the work is not directly opposite the pressure of the guide head against the other side of the groove of the work so that the danger of crushing the work as it passes out from between the presser head and guide head is overcome. When the work being lifted between the presser head and guide head by means of the work feeding fingers 54 passes out from between these clamping guides it enters between a pair of swinging clamping jaws 75 and 76 respectively which firmly clamp it and carry it to one side and release it.

The jaw member 75 is rotatably and slidably mounted on a fixed rod or shaft 77 extending across the projecting hornlike upper portion of casing or frame 20. The sleeve 78 by means of which said jaw member 75 is loosely mounted on the fixed shaft 77 has an arm 79 projecting therefrom with a pivotal connector 80 swiveled thereon and pivotally connecting it with the upper end of a yielding connecting rod comprising a rod member 81 and a slotted member 82 into which it slidably fits. A set screw 83 in the end of the slotted member 82 limits the movement of rod 81 therein and a coil spring 84 within the slot of the slotted member engages nuts 85 on the rod 81 to hold said rod with pressure against the set screw 83. This yielding connecting rod serves to connect arm 79 with a lever 86 pivotally mounted in the base of the frame and carrying a roller 87 to bear against the irregular periphery of cam 31. The connection between the lower end of the connecting rod and the lever 86 constitutes a swiveled pivotal connection 88 similar to connection 80. The swinging movement of lever 86 caused by the engagement of its roller 87 with the cam 31 imparts a swinging movement to the arm 79 through the yielding connecting rod between them and thus causes the pair of jaw members 75 and 76 to rock upon the shaft 77. The jaw members 75 and 76 are pivotally connected together above the shaft 77 and the jaw member 76 is free to swing away from the jaw member 75 though it is drawn toward the jaw member 75 by means of a spring 89 surrounding a bolt 90 which projects from the jaw member 76 and passes through the jaw member 75. This spring pressure is sufficient to cause the jaw members, which normally stand in alinement with the guide head 38 and the presser head 39 respectively to tightly clamp the work between them as it is forced from between said guide head and presser head by means of the work feeding fingers 54 and the movement imparted to said jaw members by the action of the cam 31 as just described causes said jaw members to swing with the work and carry it from a position above the guide head and presser head to a position shown in Fig. 3. Here the movement of the jaw member 76 is arrested while the movement of jaw member 75 continues sufficiently to release the work and permit it to drop. The means for arresting the movement of the jaw member 76 as shown consists of a chain 91 which is fastened at one end to the jaw member 76 and at the other end to the interior of the frame 20. When this chain becomes taut it stops the swinging movement of jaw member 76 for the purpose stated.

Besides having the swinging movement above described the jaw members 75 and 76 have a sliding movement on their shaft 77 which is produced at the same time that their swinging movement takes place in order that the work may be drawn back from a position above the saw or cutter before it is released. This movement of the jaw members is produced by means of an arm 92 projecting from the sleeve 78 or jaw member 75 and carrying a roller 93 at its end traveling in an oblique slot in an arc shaped guide 94 secured to the top of the casing. The travel of the roller 93 in the oblique guide slot causes a shifting movement of the jaw members on the fixed shaft 77 and thus causes the jaw members to travel with the work away from the saw as well as swinging it from above the feeding plane of the work. The presence of the spring 84 and the yielding construction of the connecting rod permits of the lever 86 moving to the extent of its travel without affecting lever 79 or swinging the jaw members in event of there being an obstruction to such swinging movement through any cause. The lever 86 is held upwardly against the cam 31 by means of a spring 95 which has its upper end connected with the frame and its lower end connected with the slotted member 82 of the connecting rod. The oscillating and swiveling connections 80 and 88 at the ends of the connecting rod permit of the sliding and rocking movement of the jaw members without binding.

Inasmuch as the jaw members are required to support the strip of work by their engagement therewith at a comparatively short portion of one end of the strip it is desirable to provide positive engaging means to assist the frictional clamping action of the jaw members in maintaining their hold upon the work. For this purpose the jaw member 76 is provided at each end with a swinging hook 96 which is held by a spring 97 against a stop pin 98 where its projecting nose portion extends beneath the space between the jaw members 75 and 76. In the upward movement of the work the hook member 96 is forced out of the path of the work by the engagement of the work with the rounded cam end of the nose thereof, but as soon as the work has passed above this portion of the hook the spring 97 swings the hook beneath the work to engage it and prevent its falling from between the jaw members. In order that the hooks 96 may be removed from beneath the work when the jaw members are opened to permit the work to fall as shown in Fig. 3 said hooks 96 have downwardly extending lugs 99 to engage the edge of the guide head 38 during the swinging movement of the jaws and are thereby withdrawn against the pressure of their springs from beneath the work. The hook member 96 at the cutter end of the jaw member is provided with a number of spring pressed dogs 100 pivotally mounted thereon and each of these dogs has a shoulder 101 to engage the shoulder at the upper edge of the work when the hook member 96 swings beneath the work. These dogs 100 have their shoulders 101 at different elevations so that whatever the width of the work there will be a shoulder of one of the dogs in position to be engaged thereby when the hook member 96 springs beneath the work. These shoulders are held out of the path of the work during the upward travel of the work by having downwardly extending lugs 102 engaging a pin 103 standing out from the side of the hook member 96. Thus when the hook member 96 is forced by the upward movement of the work to swing out of the path of the work it carries all of the dogs 100 with it to remove their shoulders from the path of the work, but when the hook member swings into engagement with the lower edge of the work the dogs 100 move with it and one of them engages its shoulder 101 with the upper edge of the work and thus a further security is provided against the work swinging between the jaw members or losing its position while being carried thereby.

Figure 4:
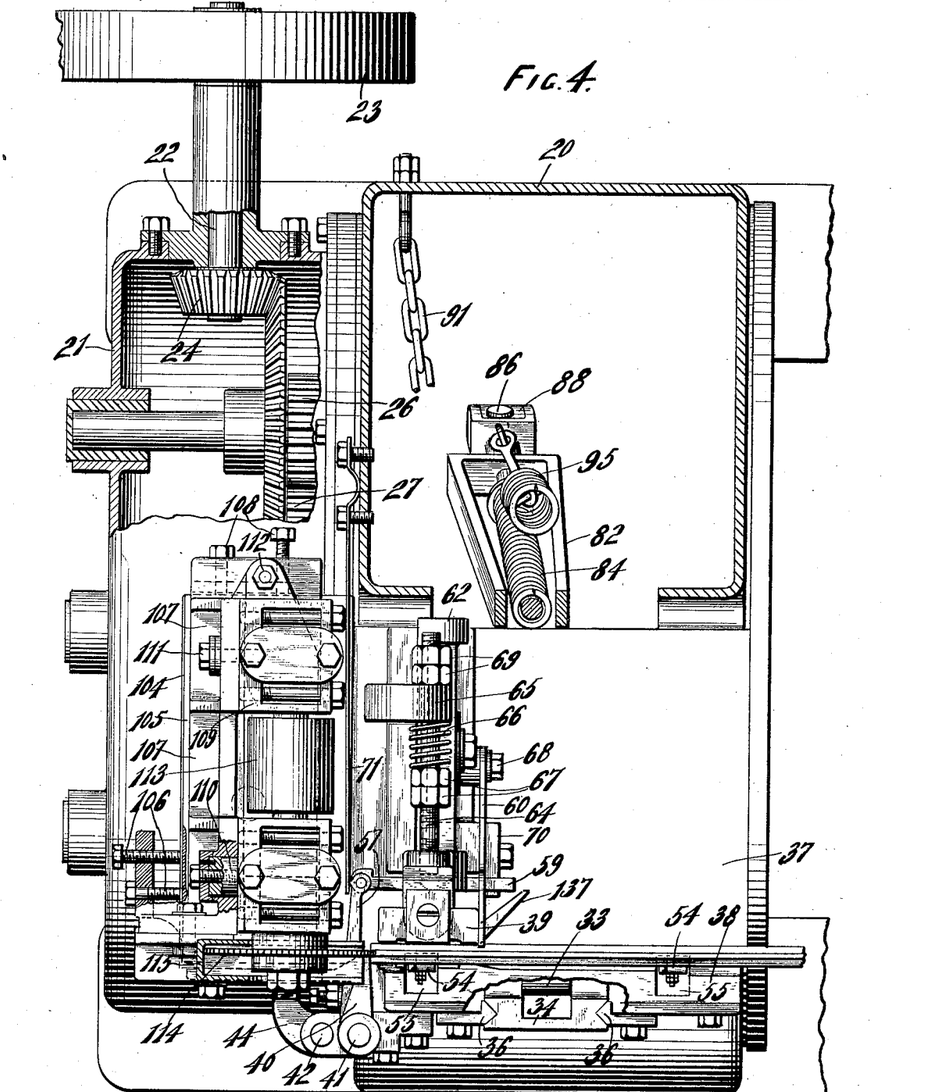
Fig. 4 is a sectional plan view with the parts in the position assumed by them when the work shown in full lines is just entered in the feeding means.

During the upward travel of the work between the guide head 38 and the presser head 39 it is brought into engagement with the cutters, there being one of such cutters when the machine is set for cutting a groove and two cutters when the machine is set for cutting a tongue. In Figs. 1, 2, 3, 4 and 5 a single cutter mechanism is shown for cutting the groove while in Figs. 16, 17 and 18 the double cutter mechanism is shown for cutting the tongue. With the single cutter a bracket shelf 104 is bolted to the frame of the machine and on it is fitted a plate 105 which may be adjusted nearer to or farther from the end of the work where it is limited by engagement with trigger 40 by means of a pair of set screws 106. A frame 107 is slidably mounted on the plate 105 and is horizontally adjustable thereon at right angles to the line of horizontal adjustment of the plate by means of a pair of set screws 108 thereon engaging the plate. This frame has a pair of upstanding cheeks against which fit a pair of bearings of a bearing frame 109, the outline of which is as shown by dotted lines in Fig. 3. This bearing frame as seen in Fig 4 has a trunnion 110 extending from the bearing next to the cutter which fits in a corresponding socket in the cheek of the frame 107 to form a pivotal support for the bearing frame and the clamping bolt 111 at the other end of the bearing frame rides in a slot of frame 107 to permit of a pivotal adjustment of the bearing frame on the trunnion as a fulcrum, such adjustment being accomplished by means of nuts 112 on a threaded stud extending upwardly from frame 107, such nuts engaging between them a projection of the bearing frame 109. A saw arbor 115 is rotatably mounted on the frame 107. By means of this construction the cutter may be adjusted nearer to or farther from the work by means of the set screws 106 and may be moved nearer to one side or the other of the work by the adjustment of set screws 108 while it may be tilted to vary the width of the groove cut thereby by adjusting the inclination of the bearing frame by means of the set nuts 112. A clamping screw 116 is carried by the frame 107 and passes through openings in the plate 105 and the bracket shelf 104 and has a volute spring 117 thereon engaging a washer 118 which is held tightly against the bottom of the bracket shelf 104 to hold the parts in place during adjustment thus permitting of the adjustments during the operation of the machine.

Figure 17:
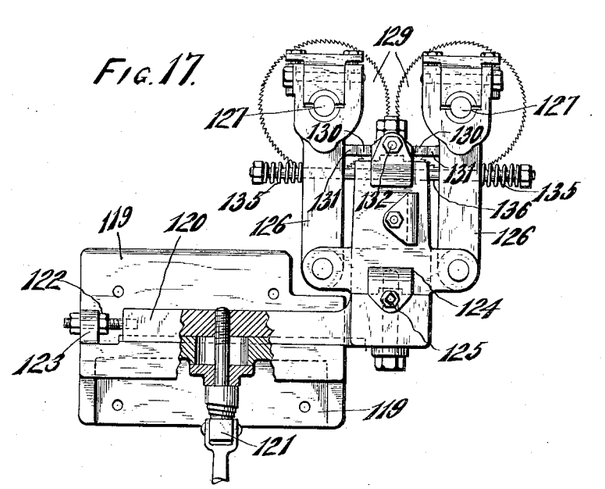
Fig. 17 is a side elevation thereof.
Figure 18:
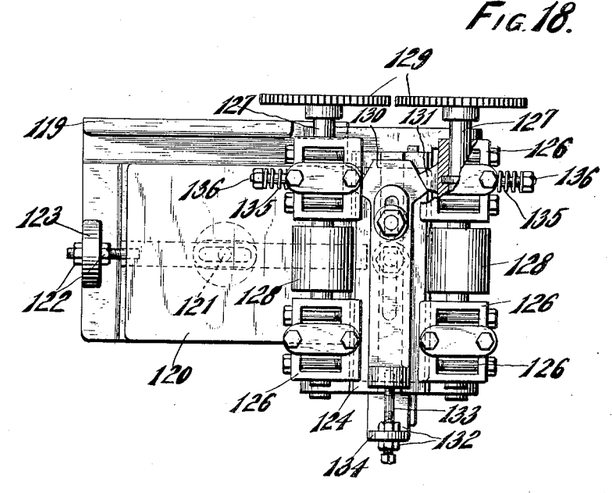
Fig. 18 is a plan view thereof.

When the double cutter is employed for cutting a tongue on the end of the work a somewhat smaller bracket shelf 119 is substituted for bracket shelf 104 and on this bracket shelf is slidably mounted a plate 120 which is held by a clamping screw 121 similar to the clamping screw 116 and which is adjustable to move the cutters nearer to one side or the other of the work by means of set nuts 122 on a threaded stud of said plate 120, the nuts bearing on opposite sides of lug 123 stand up from the bracket shelf 119. Slidably mounted on the plate 120 is a frame 124 which is adjustable nearer to or farther from the end of the work by set screws and which carries a pair of swinging bearing frames 126 on opposite sides thereof. The saw arbors 127 with their belt pulleys 128 and their cutters 129 are mounted in the bearings carried by these swinging bearing frames 126. A wedge 130 is slidably mounted on the frame 125 and has its cam wedge surfaces bearing against corresponding cam lugs 131 of the swinging bearing frames 126 and is adjustable by means of set nuts 132 on a threaded stud 133 thereof engaging a lug 134 of the frame 124 to move the cutters farther apart or permit them to move closer together. The latter movement is accomplished by means of springs 135 on a bolt 136 which passes through the two swinging bearing frames 126 as shown in Figs. 17 and 18. These springs further permit the cutters to move farther apart to prevent the work being jammed between them if for any reason it loses its restraint due to the pressure of the presser head against it.

In operation the machine runs continuously without interruption and the strips of flooring or other material forming the work to be operated upon are fed at the convenience of the operator by placing a strip upon the table 37 and pressing it rearwardly between the tapering receiving jaws formed between the stationary guide head 38 and an obliquely positioned guide 137 projecting from the presser head 39. He forces the strip through this throatway until it engages the trigger 40 and causes it to swing the latch lever 57 and permit the latch 60 to drop. In this locked position the trigger 40 forms a stop for determining the position of the strip of work in order to receive the proper depth of cut by the cutter when the work is moved upwardly. It is not necessary for the operator to hold the work in this position against the spring pressure of the trigger 40, for the trigger is held by the falling of latch 60 so that the operator may leave the strip and at once proceed to bring another strip into position. The strip of work remains in the position to be operated upon only so long as it requires the work lifting means to return to its lowermost position, wherever it may have been at the time the strip was inserted and when it does so return to its lowermost position the flanged rail 47 swings into the line of travel of the roller 48 since the turning of shaft 42 incident to the swinging movement of the trigger 40 has prepared the way for such action. If the roller happened to be in its lowest position at the time the trigger was pressed by the work the flanged rail 47 would have instantly been moved to its position in the line of travel of the roller, but if the roller was in the course of its upward or downward travel the engagement of the flanged rail with the side of the roller would retard the complete movement of the flanged rail until the roller had passed below the rail. The effect of the engagement of the roller with the rail on its upward travel is to project the feeding fingers 54 into the path of travel of the work between guide head 38 and the presser head 39 and therefore these feeding fingers engage the lower edge of the work and force it through this path of travel and into the range of operation of the cutter. The clamping action of the spring pressed presser head 39 serves to hold the work in a horizontal position during its upward travel notwithstanding the fact that the engagement is made at one end of the work only and the strip of work may be of considerable length. When the work has passed the cutter it is continued in its upward movement until it is free from engagement with the guide head and presser head and is instead clamped between the jaw members 75 and 76. Here it is likewise subjected to spring pressure which will maintain it in its horizontal position and as a further assurance against a tilting of the work the hooks 96 swing beneath it and one of the dogs 100 brings its shoulder into engagement with its upper edge. At this time the cam 31 forces the lever 86 downwardly and thereby swings the jaw members so that they carry the strip with them away from the plane of the path of upward travel of the work and the action of the cam 94 on the jaw members is to cause them to move the work back from the cutter as well. Before completing the swinging movement of the jaws the chain 91 becomes taut and checks the movement of jaw member 96 permitting jaw member 95 to move away from it slightly and release the work and allow it to drop onto a conveyer or other means not shown for receiving it. In its upward movement the work engages and lifts the latch 60 so that as soon as one strip is out of the way the trigger 40 is restored by the action of spring 71 to its former position and another strip of work may be fed into place.

By means of this machine the operator is not required to give his attention to the work after it has been placed in position, for it is fed automatically and as soon as it is started on its upward movement another strip may be fed and thus the speed of operation will depend only upon the rapidity with which the strips may be placed in position on the feed table.

There is no danger of the feeding fingers 54 being thrown into the path of the work at any other time than when they are in position to pass beneath the edge of the work, for their inward movement depends upon the engagement of the roller 48 with the lower end of the flanged rail 47 and at the beginning of their downward movement they are retracted by the swinging of the member 49 on which the roller is carried. Thus there is no danger of the work being torn or injured by the work feeding fingers. The arrangement of the bearing faces of the presser head and the guide head is such that their pressure being shifted to points which are not exactly opposite before the work leaves the space between them prevents the crushing of the lower edge of the work which is weakened by the presence of the groove on the work leaving the presser head.

The parts are made adjustable to accommodate work of different sizes. The adjustment of the set nuts 69 determines the distance between the presser head and the guide head and constitutes the adjustment for work of different thickness. The adjustment of the set nut 67 determines the pressure with which the work is clamped between the presser head and the guide head. The position of the cutter is adjustable toward or away from the work by the set screws 106 to vary the depth of the cut and the angularity of the cut is varied by the adjustment of set nuts 112 to vary the width of the cut while the adjustment of set screws 108 determines the distance of the cut from the face of the work.

The presser head 39 being pivotally mounted enables it to engage the work along both bearing surfaces of the presser head even though there may be a variation in the thickness of the work near its end as is frequently the case, and thus assure the proper clamping of the work notwithstanding its tapering form.

The double cutter mechanism constitutes a ready attachment to be quickly and easily substituted for the single cutter mechanism and having all the adjustments thereof with the further ability of the cutters to move apart when occasion requires to avoid accident.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

The present invention consists in various improvements which, when combined as illustrated in the drawings and described in this specification, make up an exceedingly satisfactory machine. Many of said improvements may, however, be used separately in other machines of this class or of other kindred classes and I do not desire to limit my invention to any combination of the different improvements except in so far as the same shall be done by the claims appended to this specification wherein these different improvements are clearly pointed out and closely defined.

What I claim as new and desire to secure by Letters Patent is:

1. An end matcher, comprising a cutter, a guide head and a presser head forming between them a guideway for the passage of work, a movable stop engaged by the work when positioned in the guideway, a movable guide controlled in its position by the movements of the stop, a reciprocating work feeding slide, fingers thereon for engaging the work to move it through the passageway, and means on the work feeding slide for engaging the guide for moving the fingers into position to engage the work.

2. An end matcher, comprising a cutter, a pair of guides between which the work travels into engagement with the cutter, a reciprocating work feeding means movable into and out of position for forcing the work between said guides, a movable stop determining the position of the work between the guides and movable thereby for effecting the movement of the work feeding means into position for forcing the work between the guides.

3. An end matcher, comprising a pair of guides forming a guideway between them, work feeding means movable into and out of the guideway for forcing work through the guideway, an arm engaged by the work when it is placed in position in the guideway, a shaft on which the arm is mounted adapted to be moved by the engagement of the work with the arm, a swinging frame moved by the shaft and provided with a guide rail, and a roller on the work feeding means to engage the guide rail for moving the work feeding means into the guideway when the work is in position therein.

4. An end matcher, comprising a cutter, guides forming a guideway between them for the travel of work past the cutter, a trigger in position to be engaged by the work when it is placed in the guideway, a shaft on which the trigger is mounted, a second shaft geared to the first mentioned shaft, a frame on the second shaft having a limited movement thereon, a spring bearing against the frame, a guide rail carried by the frame, a reciprocating work feeding slide, work feeding fingers pivotally mounted thereon and capable of being swung into or out of the passageway, an arm carried by the work feeding fingers, and a roller on the arm for engaging the guide rail for projecting the work feeding fingers into the guideway when the trigger is engaged and moved by the work.

5. An end matcher, comprising a cutter, a pair of guides forming a guideway between them, reciprocating work feeding means movable into and out of the guideway, a trigger in position to be engaged by the work when it is placed in the guideway and controlling the movement of the work feeding means into the guideway, and latching means for holding said trigger in the position to which it is moved by its engagement with the work, said latching means projecting into the path of the work to be released thereby during the travel of the work through the guideway.

6. An end matcher, comprising a cutter, a pair of guides forming a guideway between them, reciprocating work feeding means movable into and out of the guideway, a trigger in position to be engaged by the work when it is placed in the guideway and controlling the movement of the work feeding means into the guideway, a latch lever moved by the trigger, a bolt carried thereby provided with a shoulder, a latch for engaging the shoulder to hold the trigger in the position to which it is moved by the work, said latch extending into the path of the work to be released by the work during its travel, and a spring for returning the latch lever and bolt when the latch is released.

7. An end matcher, comprising a cutter, a work support, a pair of guides forming a guideway between them, reciprocating work feeding means movable into and out of the guideway, a trigger in position to be engaged by the work when placed in the guideway, a latch means moved by the trigger for locking the trigger in the position to which it is moved by the work, means for adjusting the position of the latching means with relation to the trigger whereby the trigger may constitute an adjustable stop for determining the position of the work, said latch means being adapted to be released by the movement of the work in the guideway.

8. An end matcher, comprising a cutter, a pair of guides forming a guideway between them, a reciprocating work feeding slide, a spring pressed rock shaft thereon, work feeding fingers on the rock shaft adapted to be moved into or out of the guideway by the movement of the rock shaft, an arm on the rock shaft, a spring pressed member pivotally mounted on the arm, a stop engaged by the member, a roller carried by the member, and a guide rail adapted to be moved into the path of the roller for causing the arm to swing to move the work feeding fingers into the guideway in one direction of movement of the work feeding slide, said spring pressed member 9. An end matcher, comprising a cutter, a pair of guides forming a guideway between them, means for feeding work through the guideway past the cutter, a pair of jaw members pivotally connected together and pivotally mounted to be capable of movement together, spring means for holding the jaws together, an arm provided for one of the jaw members, means for moving the arm for causing the jaw members to swing from a position in alinement with the guides to a position at one side thereof, and means for limiting the movement of the jaw member which is not provided with the arm.

10. An end matcher, comprising a cutter, a pair of guides forming a guideway between them, means for feeding work through the guideway past the cutter, a pair of jaw members pivotally connected together and pivotally mounted to be capable of movement together, spring means for holding the jaws together, an arm provided for one of the jaw members, means for moving the arm for causing the jaw members to swing from a position in alinement with the guides to a position at one side thereof, and a chain or the like connected at one end with the jaw member not provided with the arm and connected at the other end to a stationary support.

11. An end matcher, comprising a cutter, a pair of guides forming a guideway between them, means for feeding work through the guideway past the cutter, a pair of jaw members pivotally connected together and pivotally mounted to be capable of movement together, means for swinging the jaw members from a position in alinement with the guides to a position at one side thereof, and a spring pressed hook on one of the jaw members for engaging beneath the work when it enters between the jaw members, said hook being adapted to engage one of the guides during the swinging movement of the jaw members to withdraw the hook from beneath the work.

12. An end matcher, comprising a cutter, a pair of guides forming a guideway between them, means for feeding work through the guideway past the cutter, a pair of jaw members pivotally connected together and pivotally mounted to be capable of movement together, means for swinging the jaw members from a position in alinement with the guides to a position at one side thereof, a spring pressed hook on one of the jaw members for engaging beneath the work when it enters between the jaw members, and a series of shouldered dogs adapted to be swung by the hook out of the path of the work as the work enters between the jaw members, but being permitted to return to engage the upper edge of the work when the hook passes beneath the work.

13. An end matcher, comprising a cutter, a pair of guides forming a guideway between them, means for feeding work through the guideway past the cutter, a pair of jaw members pivotally connected together and pivotally mounted to be capable of movement together, a cam for causing the jaw members to slide laterally during their swinging movement, an arm on one of the jaw members, a rod having a pivotal and swiveling connection with the arm, a suitably operated lever, a slotted member having a pivotal and swiveling connection with the lever and having the rod telescoping therein, a set screw in the slotted member against which the rod bears, and a spring surrounding the rod for holding it normally against the set screw.

14. A cutter mounting and arrangement for end matchers and the like, comprising a shelf, a plate slidable in ways on the shelf, a frame slidable in ways on the plate at right angles to the guideways of the shelf, means for adjusting the position of the plate on the shelf, means for adjusting the position of the frame on the plate, a bearing frame pivotally mounted in said frame, means for adjusting the pivotal position of the bearing frame, a saw arbor journaled in the bearing frame, a saw on the arbor, and means for turning the saw arbor.

15. A cutter mounting and arrangement for end matchers and the like, comprising a shelf, a plate slidable in ways on the shelf, a frame slidable in ways on the plate at right angles to the ways of the shelf, a bolt on the frame passing freely through larger openings in the plate and the shelf, a spring surrounding the bolt for clamping the parts together, means for adjusting the position of the plate on the shelf, means for adjusting the position of the frame on the plate, a bearing frame pivotally mounted in said frame, means for adjusting the pivotal position of the bearing frame, a saw arbor journaled in the bearing frame, a saw on the arbor, and means for turning the saw arbor.

16. In an end matching machine, a cutter, a pair of guides forming a guideway between them, means for forcing one of the guides toward the other to clamp the work between them, means for forcing the work through the guideway past the cutter, one of said guides having a pair of spaced guide faces extending in the direction of travel of the work and the other guide having similar guide faces opposite thereto but terminating before reaching the end of the guide with a substitute guide face between them at the end of the guide to maintain pressure against the work as it passes from between the guides but avoiding pressure at opposite points on the work at the last engaged portion of the work.

17. A cutter for end matchers and the like, comprising a shelf, a plate slidable in ways on the shelf, a frame slidable in ways on the plate at right angles to the ways of the shelf, means for adjusting the position of the plate on the shelf, means for adjusting the position of the frame on the plate, a pair of bearing frames pivotally mounted on the said frame, a bolt passing through the bearing frames and provided with springs for pressing the bearing frames toward each other, a wedge slidably mounted on the said frame and engaging the two bearing frames for forcing them apart against the action of the springs, saw arbors journaled in the bearing frames, saws in the arbors, and means for turning the saw arbors.

18. An end matcher, comprising a cutter, a pair of guides forming a guideway between them, means for feeding work through the guideway past the cutter, a pair of jaw members pivotally connected together and pivotally mounted to be capable of movement together, a cam for causing the jaw members to slide laterally during their swinging movement, an arm on one of the jaw members, a suitably operated lever, and a yielding connecting rod connecting the lever and the arm.

19. A cutter mounting and arrangement for end matchers and the like, comprising a support, frames pivotally mounted on the support, arbors journaled in the frames with their axes parallel with the pivotal axes of the frames, and cutters on the arbors turning in the direction of feed of the work and adapted to separate and prevent the work becoming wedged between them.

In testimony whereof, I affix my signature, in presence of two witnesses.

WILLIS S. SHERMAN.

Witnesses:
R. S. C. CALDWELL,
KATHERINE HOLT.

Copies of this patent may be obtained for five cents each, by addressing the "Commissioner of Patents, Washington, D. C."